Dec. 16, 1941.     C. M. OSTERHELD     2,266,257
HEAT STORAGE CONTROL SYSTEM
Filed Sept. 6, 1941     2 Sheets-Sheet 2
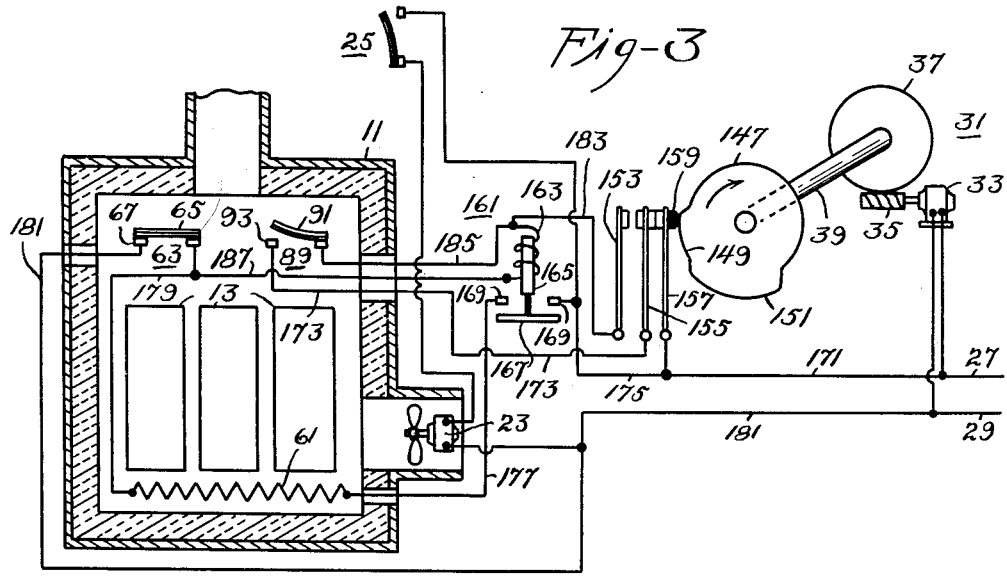
INVENTOR.
CLARK M. OSTERHELD
BY
H M Biebel
ATTORNEY Patented Dec. 16, 1941

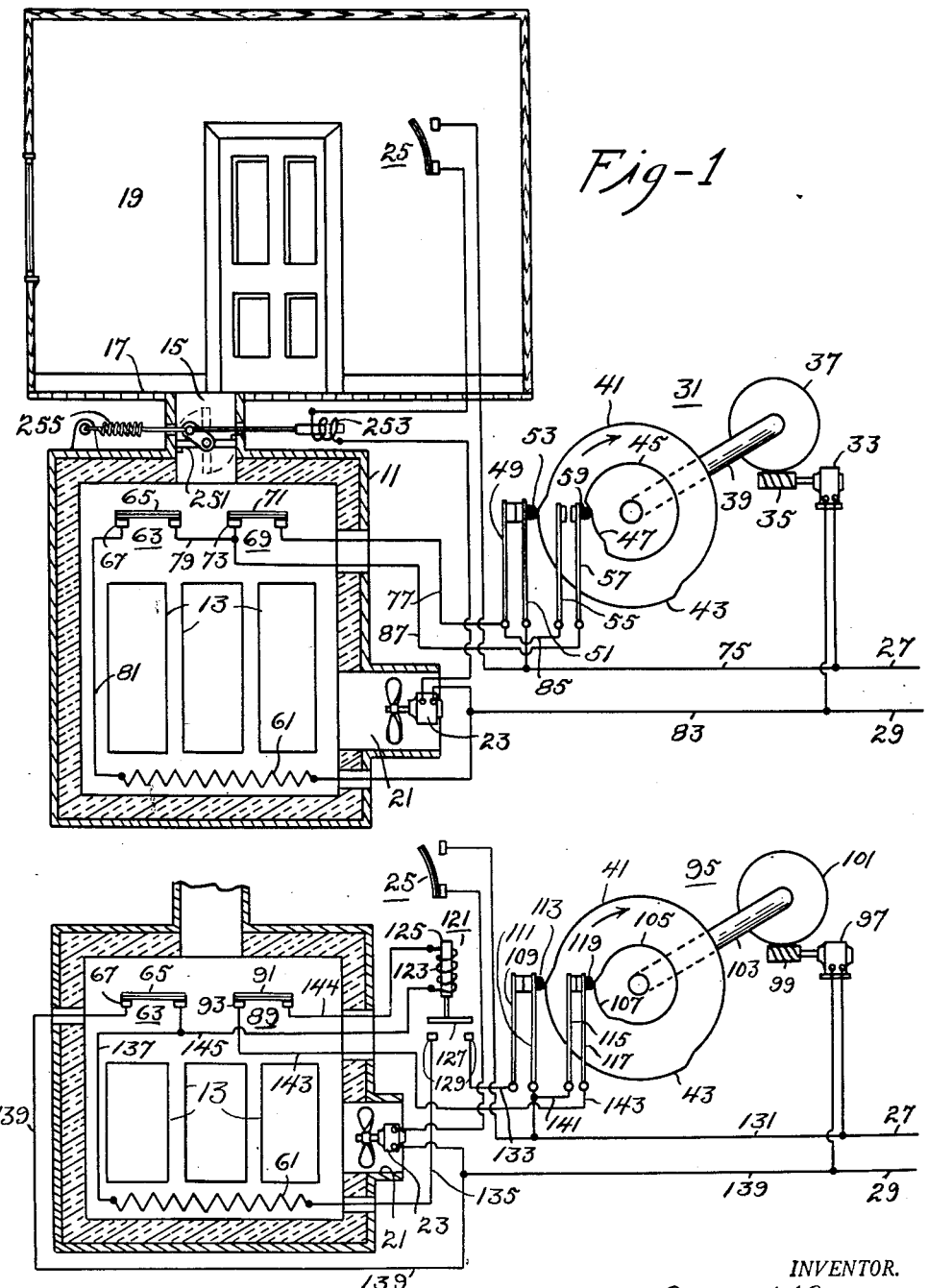

2,266,257

UNITED STATES PATENT OFFICE 2,266,257

HEAT STORAGE CONTROL SYSTEM

Clark M. Osterheld, Stoughton, Wis., assignor to McGraw Electric Company, Elgin, Ill., a corporation of Delaware Application September 6, 1941, Serial No. 409,817

8 Claims. (Cl. 219—39)

My invention relates to house heating systems and particularly to systems for controlling the storage of electrically generated heat in heat storing masses.

An object of my invention is to provide a control system for effecting the energization of an electric heater for generating and storing heat mainly during off-peak periods.

Another object of my invention is to provide a control system for storing heat in heat storing masses operable to cause a fixed delay after the start of an off-peak period in case the temperature of the heat storage mass is above a given value and to start energization of the heater at the start of an off-peak period in case the temperature of the heat storage mass is below a given value.

Other objects of my invention will either be apparent from a description of several forms of systems embodying my invention or will be pointed out in the course of such description and set forth in the appended claims.

In the drawings,

Figure 1 is a diagrammatic representation of one control system embodying my invention as applied to a heat storage mass having associated therewith air-moving means and as applied to a dwelling, Fig. 2 is a schematic diagram of connections of another control system embodying my invention, with certain of the details shown in Fig. 1 omitted, Fig. 3 is still another diagram of connections embodying my invention as applied to a heat storage mass, and, Fig. 4 is a still further modification of a heat storing control system embodying my invention.

House heating is being effected by air-moving or ventilating means, the heated air deriving its heat from a heat storage mass which, in some instances, has been simply a mass of say metal, positioned within a suitable heat insulated enclosure, having electric heating means operatively associated therewith and a ventilating or air-moving fan of suitable design controlled by one or more thermostats at least one of which would be in a room representative of the average temperature conditions of a house.

Since central stations or public utilities furnishing current to users have a period of relatively light load, usually extending from say 10 or 11 p. m. to about 6 or 7 a. m., they are willing to make a reduced rate for electric energy when used at such an off-peak period, particularly so if the load or loads are applied to the system at the time of maximum drop in the load or, to put it in another way, at the time of really minimum load on the power house.

Referring first to Fig. 1 of the drawings, I have there illustrated an enclosure 11 which is adapted to receive a mass 13 of heat storage material which is indicated generally only in broken lines and is to be understood as being made up of any suitable or desired material in any suitable, desired or available shapes, it being understood, of course, that it must be possible to heat substantially all of the mass to a predetermined average temperature without too great a variation in the temperatures of different parts of the heat storage mass and that it must be possible to move air through the heat storing mass, out of the enclosure and into the room or rooms where it is to be used to maintain the temperature at a desired value, say 70° F. to 75° F. Since the details of the construction of the enclosure and the details of construction of the heat storage mass form no part of my invention, they are shown generally only.

A conduit 15 connects the enclosure 11 with say the floor 17 of a room or the floor of any building having a room 19 or rooms to be heated.

The enclosure 11 is provided also with an air inlet opening 21 in which, in suitable and proper position, there is positioned a motor driven fan 23 adapted to force air over or through the heat storage mass 13 and it is to be understood that while this inlet 21 is shown as of relatively short length, it may be of any size, contour and length and the incoming cold air may be gathered in the room in which the enclosure 11 is located or it may be taken from outside of the building.

A room thermostat 25 here shown as an ordinary bimetal thermostat, is connected with the motor driven fan 23 and to a supply circuit including supply circuit conductors 27 and 29 so that the fan motor will be energized when the temperature in room 19 drops below a given value, will operate to force cold or cool air through the heat storage mass 13 and into the room 19 until the temperature in that room has caused the thermostat 25 to move to the position shown in Fig. 1 of the drawings when the fan motor will be deenergized and remain so until the temperature in the room or other area to which thermostat 25 is responsive drops an amount sufficient to cause reclosing of the thermostat 25.

I provide a continuously operative timer 31 here shown as comprising a small electric motor 33 connected to the supply circuit conductors 27 and 29 and having a worm 35 on the shaft which meshes with and drives a worm gear 37 which is secured to a shaft 39.

A cam disk 41 is mounted on shaft 39 and may be secured thereon in such manner as to be shiftable peripherally thereof. The greater part of the radius of cam disk 41 is of constant outer radius but the cam includes also a portion 43 of somewhat larger radius and this cam surface or portion is in effect, the off-peak portion and is shown as extending over substantially one-third of the periphery. Since I have shown the driving mechanism for the cam 41 generally only, I desire to state here that it is desired to cause one complete revolution of the cam disk 41 in twenty-four hours, so that the off-peak portion will extend over substantially eight hours and the cam disk may be so set on shaft 39 that the off-peak portion 43 operates to close a switch, to be hereinafter described in detail, at 10 p. m. and causes opening of this switch at say 6 a. m. While I have shown and prefer to use an electric motor, I do not desire to be limited thereto, but may use any other kind of constantly operative timer effective for the same purpose.

I provide further a second cam disk 45 adjacent to and at one side of cam disk 41, the greater portion of the periphery of this cam disk 45 being of uniform radius but having a small portion 47 of smaller radius. I may point out here that the peripheral extent of portion 47 is such as to amount to two or three hours out of the total of twenty-four hours, it being understood that cam disk 45 will also turn through one complete revolution in twenty-four hours.

I provide a first timer controlled switch including a substantially rigid contact arm 49 and a resilient contact arm 51 which latter is normally biased out of engagement with arm 49 but is moved into engagement with it when a lug 53, of electric-insulating material, on contact arm 51 engages portion 43 of cam disk 41. The switch including contact arms 49 and 51 is shown in its closed position and the time is therefore just a little after 10 p. m.

I provide an auxiliary timer-controlled switch including a substantially rigid contact arm 55 and a resilient contact arm 57 normally yieldingly biased out of engagement with arm 55 in which position it is shown in Fig. 1 of the drawings since a lug 59, of electric-insulating material, on arm 57 has entered the portion 47 of lesser outer radius than the rest of cam 45. It will be understood that when lug 59 rides upon the other part of cam disk 45, of the greater radius, contact arm 57 will be in engagement with arm 55.

I provide an electric heater 61 which I have illustrated as being positioned in the enclosure or casing 11 and have indicated it generally only since the details of construction and location thereof form no part of my present invention.

I provide a main thermal switch 63 here shown as including a bi-metallic bar 65 having one end fixed and the other end adapted to engage with or be disengaged from a contact member 67. I provide further an auxiliary thermal switch 69 which may include a bimetal bar 71 having one end fixed to a contact member and adapted to engage with or be disengaged from a fixed contact 73.

A conductor 75 connects supply circuit conductor 27 with contact arm 51 while contact arm 49 is connected by a conductor 77 with bimetal bar 71. Contact member 73 is connected by a conductor 79 with bimetal bar 65 and contact 67 is connected by a conductor 81 to one terminal of heater 61, the other terminal of which is connected by a conductor 83 with supply circuit conductor 29. Contact arm 49 is connected by a conductor 85 with contact arm 55 while contact arm 57 is connected by a conductor 87 with contact 73 and therefore with conductor 79.

It is to be noted that the main thermal switch 63 is designed, constructed and adjusted to cause bimetal bar 65 to move out of engagement with fixed contact member 67 at substantially 800° F. but to remain in contact therewith until the temperature to which it is responsive is substantially 800° F. The auxiliary thermal switch 69 is designed, constructed and adjusted so that the bimetal bar 71 will remain in engagement with fixed contact 73 until substantially a temperature of 500° F. is ambient thereto, at which time it will move out of engagement with contact 73.

Let it be assumed that the time is a few minutes after 10 p. m. and that the parts of the system are in substantially the positions shown in Fig. 1 of the drawings. Since both the main and the auxiliary thermal switch are in closed positions, which means that the temperature of the heat storage mass is below 500° F., energization of the heater 61 will be effected at the start of an off-peak period, that is, as soon as contact arm 51 is moved into engagement with contact arm 49 which, as has been above set forth, has occurred at say 10 p. m. The energizing circuit through heater 61 may be traced as follows: From supply circuit conductor 27 through conductor 75 to contact arm 51, from there to contact arm 49, through conductor 77 to and through bimetal bar 71, contact 73, conductor 79, bimetal bar 65, contact 67 and from there through conductor 81 to and through heater 61 and from there through conductor 83 to the other supply circuit conductor 29. It is, therefore, evident that energization of the heater 61 will be effected immediately at the start of an off-peak period and the design, construction and adjustment of all the parts of my improved control system is to be understood as being such that heating of the heat storage mass 13 to substantially 800° F. will be effected substantially within an off-peak period since it is evident that disengagement of contact arm 51 from contact arm 49 will deenergize the system and, as has already been set forth, this will occur when lug 53 rides off of portion 43 of cam disk 41.

Let it be assumed, in order to show the operation of my improved control system, that while the temperature of the heat storage mass is less than 800° F., its temperature is above 500° F. so that bimetal bar 71 is flexed out of engagement with contact 73. In this case engagement of contact arm 51 with contact arm 49 by the timer-controlled means would not cause energization of the heater 61 at the start of an off-peak period. It will be noted, however, that when contact arm 57 is moved into engagement with contact arm 55, by engagement of lug 59 with the leading edge of portion 45, which will occur at say 12 midnight or 1 a. m., an energizing circuit through the heater 61 will be established as follows: From supply circuit conductor 27 through conductor 75 to contact arm 51 to and through contact arm 49, conductor 85, contact arms 55 and 57 which are now in engagement with each other, through conductors 87 and 79, through bimetal bar 65 and contact 67 and from there through conductor 81 and the electric heater 61 and conductor 83 to the other supply circuit conductor 29. This energization of heater 61 is therefore effected at a fixed time or after a fixed delay period after the start of an off-peak period and this energization will continue until either mechanically terminated by disengagement of contact arm 51 from arm 49 at the end of an off-peak period or by flexing of bimetal bar 65 when the temperature of the heat storage mass to which the main thermal switch 63 responds has reached substantially 800° F. It is, therefore, evident that energization of the heater 61 is selectively terminated either by the contact arms 51 and 49 being moved out of engagement with each other at the end of an off-peak period or at some time before the end of but during an off-peak period, by warping or flexing movement of the main thermal switch 63.

Referring now to Fig. 2 of the drawings, I have there shown the enclosure or casing 11, the heat storage mass 13, and the main thermal switch 63 which is of the same construction and method of operation as has hereinbefore been described in connection with Fig. 1 of the drawings. I provide an auxiliary thermal switch 89 including a bimetal bar 91 having one end secured to a fixed contact member while the other end thereof is adapted to engage with and be disengaged from a fixed contact member 93. The auxiliary thermal switch 89 is designed, constructed and adjusted to be in open position at all temperatures below substantially 500° F. and to close or to have the bimetal bar 91 engage contact member 93 at temperatures above 500° F.

A continuously operative timer 95 includes an electric motor 97 having a worm 99 on its shaft adapted to mesh with and drive a worm gear 101 which is mounted on a shaft 103. While I have shown a simplified mechanical driving means it is to be understood that this is general and representative only, the object being to cause rotation of say, shaft 103, through one whole or complete revolution in twenty-four hours. I mount a cam disk 41 on shaft 103 which is substantially the same as has hereinbefore been described in connection with Fig. 1. I provide an auxiliary cam disk 105 adjustably secured on shaft 103 the greater part of the periphery being of substantially uniform radius but having a relatively short portion 107 of slightly larger radius and extending over substantially two to three hours as may be desired.

I provide a main timer-controlled switch including a substantially rigid contact arm 109 and a resilient contact arm 111 normally yieldingly biased out of engagement with contact arm 109 but adapted to be moved into engagement therewith when a lug 113 on arm 111 is engaged by the leading edge of portion 43 of cam disk 41. I provide also an auxiliary timer-controlled switch including a substantially rigid contact arm 115 and a resilient contact arm 117 normally yieldingly biased out of engagement with arm 115 but adapted to be moved into engagement therewith when a lug 119 of electric insulating material on arm 117 engages portion 107 of auxiliary cam disk 105.

I provide also an electromagnetic switch 121 to control the energization of the heater 61 and this electromagnetic switch or contactor includes a coil 123 and a movable armature core 125 connected to a contact bridging member 127 which is adapted to engage with or be disengaged from two fixed contact members 129, all in a manner well known in the art.

A conductor 131 connects supply circuit conductor 27 to contact arm 111 and a conductor 133 connects arm 109 to one of the fixed contacts 129. The other fixed contact 129 is connected by a conductor 135 to one terminal of the heater 61, the other terminal of which is connected by a conductor 137 with bimetal bar 65. The contact member 67 of main thermal switch 63 is connected by a conductor 139 to the other supply circuit conductor 29. Contact arm 111 is connected by a conductor 141 with contact arm 115 and contact arm 117 is connected by a conductor 143 with contact member 93 of the auxiliary thermal switch 89. One terminal of coil 123 of the contactor 121 is connected by a conductor 144 to the fixed contact of bimetal bar 91 and the other terminal of coil 123 is connected by a conductor 145 to conductor 137 and therefore to the fixed contact of bimetal bar 65.

Let it be assumed that the bimetal bars 65 and 91 are in engaged positions as shown in Fig. 2 of the drawings so that the temperature of the heat storage mass is somewhat above 500° F. but below 800° F. When the main and the auxiliary timer-controlled switches are closed as shown in Fig. 2 of the drawings, which will occur at substantially 10 p. m., an energizing circuit through coil 123 will be established as follows: From supply circuit conductor 27 through conductor 131, to arm 111, through conductor 141 to and through the engaged contact arms 115 and 117, through conductor 143 to contact 93, engaged bimetal bar 91, through conductor 144 and coil 123 of contactor 121, through conductor 145 to bimetal bar 65, to and through contact 67 and from there through conductor 139 to the other supply circuit conductor 29. This will energize coil 123 and cause upward movement of contact bridging member 127 out of engagement with fixed contacts 129 whereby energization of heater 61 is prevented.

It is obvious that should the temperature of the heat storage mass be below 500° F., bimetal bar 91 would be out of engagement with contact 93 and the above described energizing circuit of coil 123 of the heater control switch 121 would not have been established, with the result that contact bridging member 127 would be in engagement with fixed contacts 129 and an energizing circuit through the heater 61 would be established substantially as follows: From supply circuit conductor 27 through conductor 131, to and through the engaged contact arms 109 and 111, through conductor 133 to and through the engaged contacts 129 and 127, through conductor 135, heater 61, through conductor 137 to and through the main thermal switch 63 and from there through conductor 139 to the other supply circuit conductor 29. In this case energization of the heater 61 will be started at substantially the beginning of an off-peak period and it may occur that the average temperature of the heat storage mass reaches 800° F. a short time before the end of an off-peak period in which case bimetal bar 65 of the main thermal switch 63 will move out of engagement with contact 67 and deenergize the heater 61.

Let it be assumed, however, that both the main and the auxiliary thermal switch were in closed positions at the start of an off-peak period, as shown in Fig. 2 of the drawings, so that the contactor is open and the heater is deenergized during the initial part of an off-peak period. In this case auxiliary switch comprising contact arms 117 and 115 would be moved to open position as soon as lug 119 would ride off of the portion 107 of increased radius of the auxiliary cam disk 105 which, as has hereinbefore been stated, might be at 12 midnight or thereabouts and when this occurs the hereinbefore described energizing circuit through coil 123 of contactor 121 would be interrupted and contact bridging member 127 would drop down into engagement with fixed contacts 129 to establish the hereinbefore described energizing circuit through heater 61. Here again it may be that disengagement of lug 113 on arm 111 from the portion 43 of the main cam disk 41 at the end of an off-peak period might deenergize the heater assuming that the temperature of the heat storage mass had not yet reached 800° F. On the other hand, should the average temperature of the heat storage mass have reached 800° F. before the end of an off-peak period, the main thermal switch 63 would be effective to deenergize the heater 61.

Referring now to Fig. 3 of the drawings, I have there illustrated a further modification of a control system embodying my invention. This system includes a main thermal switch 63 with the parts as described hereinbefore in connection with Fig. 1, an auxiliary thermal switch 89 and a continuously operative timer 31 including more particularly the electric motor driving means and other parts hereinbefore described to cause one complete revolution of a shaft 39 in twenty-four hours. I provide a cam disk 147 adjustably mounted on shaft 39 the greater portion of the periphery of disk 147 being of uniform outer radius but having a relatively short portion 149 of slightly greater outer radius and a second portion 151 of still greater outer radius. The peripheral extent of portion 149 may be on the order of two or three hours and the peripheral extent of portion 151 may be such that the total peripheral extents of these two portions equal the length of an off-peak period which, as has hereinbefore been mentioned, may be on the order of eight hours.

I provide further a triple contact arm switch driven by the timer and comprising a substantially rigid outer contact arm 153 and an intermediate contact arm 155 normally yieldingly biased out of engagement with contact arm 153. I provide further a second outer contact arm 157 normally yieldingly biased out of engagement with contact arm 155 but adapted to be moved into engagement with arm 155 when a lug 159, of electric insulating material, on arm 157 engages the leading edge of portion 149. Contact arm 155 is adapted to be moved into engagement with contact arm 153 when lug 159 engages the leading edge of portion 151 of cam disk 147.

I provide further an electromagnetic switch or contactor 161 including a coil 163 and a movable core 165 connected to a contact bridging member 167, which latter is adapted to engage with and be disengaged from fixed contact members 169.

A conductor 171 connects supply circuit conductor 27 with contact arm 157 and a conductor 173 connects contact arm 155 with contact 93 of the auxiliary thermal switch 89. Conductor 171 is connected by a conductor 175 with one of the fixed contact members 169 while the other fixed contact member 169 is connected by a conductor 177 with one terminal of heater 61. The other terminal of heater 61 is connected by a conductor 179 with bimetal bar 65 and fixed contact 67 is connected by a conductor 181 with the other supply circuit conductor 29. One terminal of coil 163 is connected by a conductor 183 with contact arm 153 and a conductor 185 connects the same terminal to the fixed end of bimetal bar 91. The other terminal of coil 163 is connected by a conductor 187 to conductor 179 and therefore to the fixed end of bimetal bar 65.

Let it be assumed that the time is shortly after 10 p. m. so that contact arm 157 is in engagement with contact arm 155 and further that the temperature of the heat storage mass to which auxiliary switch 89 is responsive is above 500° F. so that bimetal bar 91 is out of engagement with fixed contact 93. No energization of coil 163 of contactor 161 can therefore occur and energization of the heater will not be effected at this time through the contacts of switch 161.

Let it be assumed now that enough time has elapsed so that lug 159 has engaged on or with the leading edge of portion 151 whereby intermediate contact arm 155 has been moved into engagement with contact arm 153. An energizing circuit through coil 163 will now be effected as follows: From supply circuit conductor 27 through conductor 171, to contact arm 157, from there through the contacts of arm 155 to the contact of arm 153, from there through conductor 183 through coil 163, through conductor 187 to and through the main thermal switch 63 and from there to and through conductor 181 to the other supply circuit conductor 29. This will energize coil 163 and cause quick upward movement of contact bridging member 167 thereby establishing an energizing circuit through heater 61 substantially as follows: From supply circuit conductor 27 through conductors 171 and 175, to and through the engaged contacts 167 and 169, through conductor 177 to and through heater 61, from there through conductor 179 to and through thermal switch 63 and from there through conductor 181 to the other supply circuit conductor 29.

It is, therefore, evident that under these conditions energization of the heater 61 will be effected after a fixed time delay after the start of an off-peak period and will continue until the heater 61 is selectively deenergized either by opening of the main thermal switch 63 or opening of the timer-controlled switch at the end of an off-peak period.

I may further point out that energization of the heater 61 will be effected at the start of an off-peak period in case auxiliary thermal switch 89 is in closed position when, at the start of an off-peak period, contact arm 157 is moved into engagement with contact arm 155. The energizing circuit through coil 163 will be substantially as follows: From supply circuit conductor 27 through conductor 171 to and through the engaged contact arms 157 and 155, through conductor 173 to and through the closed auxiliary thermal switch 89, through conductor 185 to and through coil 163 and conductor 187 to and through the main thermal switch 63 and from there through conductor 181 to the other supply circuit conductor 29. This will cause closure of the electromagnetic switch 161 and consequent energization of heater 61 all as has hereinbefore been described. The same conditions as to selective deenergization of heater 61 are present as were hereinbefore described so that if the heat storage mass 13 reaches a temperature of 800° F.

before the end of an off-peak period, the heater will be deenergized by opening of the main thermal switch 63. If the temperature of the heat storage mass is still less than 800° F. at the end of an off-peak period, main thermal switch 63 would still be in closed condition and deenergization of heater 61 would be effected by the action of the timer-actuated switch including contact arms 153, 155 and 157.

Referring now to Fig. 4 of the drawings, I have there shown a still further modification of a system embodying my invention the constantly operative timing means being substantially the same as set forth and shown in connection with Fig. 3. I provide also a main thermal switch 63 as has hereinbefore been described and an auxiliary thermal switch 69 as described in connection with Fig. 1.

I provide a contactor 189 including a coil 191 and a movable core 193 to which are attached two contact bridging members 195 and 197. Bridging member 195 is adapted to be engaged with or disengaged from fixed contact members 199 and bridging member 197 is adapted to engage with or be disengaged from fixed contact members 201.

I provide also means for recording the electric energy used by electric heater 61 on a low-rate meter 203 or on a high-rate meter 205 since the system shown in Fig. 4 of the drawings may continue the energization of heater 61 beyond the end of an off-peak period and it is, of course, desirable to record the electric energy used during an on-peak period on a high-rate meter. I provide a solenoid having a coil 207 adapted to energize a core 209 the lower end of which is connected to a pivotally mounted switch arm 211 adapted to engage either one of two fixed contact members 213 and 215, under the control of coil 207 and its core 209. Supply circuit conductor 27 is connected by a conductor 217 to contact arm 157 and to one each of the contact members 201 and 199. The other fixed contact member 201 is connected by a conductor 219 with contact 67 of the main thermal switch 63. Fixed contact member 73 of the auxiliary thermal switch is connected by a conductor 221 with one terminal of coil 191, the other terminal of which is connected by a conductor 223 with a conductor 225 connecting one terminal of coil 191 with the pivot point of switch arm 211. Contact 215 is connected to one terminal of meter 205 by a conductor 227 and contact 213 is connected by a conductor 229 with one terminal of meter 203, the other terminals of meters 203 and 205 being connected together and to supply circuit conductor 29 by a conductor 231.

Contact arm 155 is connected by a conductor 233 to the fixed end of bimetal bar 71 of auxiliary thermal switch 69. Contact arm 153 is connected by a conductor 235 to the other terminal of coil 191. Conductor 225 is connected to one terminal of coil 207 by a conductor 237 and the other terminal of coil 207 is connected by a conductor 239 with contact arm 155.

In order to provide means for manually causing energization of the system during an off-peak period in case of necessity, I provide a normally open push button switch 241 of the usual kind, one terminal of which is connected by a conductor 243 with one terminal of coil 191 and to conductor 221. The other terminal of switch 241 is connected by a conductor 245 with conductor 217.

Let it be assumed that the temperature of the heat storage mass at the start of an off-peak period is below 800° F. but above 500° F. so that the auxiliary switch will be in its open position as shown in Fig. 4 of the drawings. When contact arm 157 is moved into engagement with contact arm 155 by the leading edge of portion 149 of cam disk 147, energization of coil 191 through a circuit to be hereinafter described will not be closed since it is open at the auxiliary thermal switch 69.

However, an energizing circuit through coil 191 will be closed at the end of a fixed delay period after the start of an off-peak period when intermediate contact arm 155 is moved into engagement with the outer contact arm 153 when lug 159 engages the leading edge of portion 151 of cam 147. As stated before, this will occur at say two or three hours after the start of an off-peak period. The energizing circuit through coil 191 is established substantially as follows: From supply circuit conductor 27 to conductor 217, through the engaged contacts of contact arms 157, 155 and 153, through conductor 235 through coil 191 and from there through conductor 223 to conductor 225 and from there through switch 211 through either the low-rate meter 203 or the high-rate meter 205 and conductor 231 to the other supply circuit conductor 29. This will energize a circuit through heater 61 substantially as follows: From supply circuit conductor 27 to and through conductor 217, to and through the engaged contact members 195 and 199, through conductor 245 to one terminal of heater 61 and from there through heater 61 and conductor 225 to the other supply circuit conductor 29 through switch arm 211 in engagement with fixed contact member 213, through conductor 229 and through low-rate meter 203 and conductor 231 to the other supply circuit conductor 29.

The low-rate meter 203 will be connected in circuit with heater 61 because of the energization of coil 207 through a circuit substantially as follows: From supply circuit conductor 27 through conductor 217 to contact arm 157, to contact arm 155 through conductor 239, coil 207 and conductor 237 to conductor 225. Even if switch arm 211 were in its other position where it would engage contact member 215, it would still be connected through the high-rate meter with the other supply circuit conductor 29 so that the above described energizing circuit through coil 207 would be established and switch arm 211 would be moved into engagement with contact 213. It may here be pointed out that arm 211 is made wide enough to simultaneously engage contact members 215 and 213 at the time of its movement so that energization of the circuit or connection of the parts with supply circuit conductor 29 will not be interrupted.

Let it now be assumed that at the start of an off-peak period auxiliary thermal switch 69 was in closed position because the temperature of the heat storage mass was below 500° F. An energizing circuit through the coil of electromagnetic switch 189 would have been established at the start of an off-peak period, this circuit being substantially as follows: From supply circuit conductor 27 through conductor 217, through engaged contact arms 157 and 155, through conductor 233 to and through closed auxiliary thermal switch 69, through conductor 221, through coil 191 and then through conductor 223 to conductor 225 which, as has hereinbefore been stated, will be electrically connected to the other supply circuit conductor 29 by parts and conductors already set forth. In this case energization of the heater 61 will be effected, at the start of an off-peak period and engagement of the timer-controlled switch with portion 151 of cam 147 will have no other effect on the system. The deenergization of heater 61 will be effected by the main thermal switch 63 at a time before the end of an off-peak period if the temperature of the heat storage mass reaches substantially 800° F. before the end of an off-peak period.

A holding circuit through coil 191 of contactor 189 is established at the time of energization of coil 191 and this holding circuit may be traced as follows: From supply circuit conductor 27 through conductor 217 to and through the engaged contact members 197 and 201 through conductor 219 to and through the closed main thermal switch 63, through conductors 79 and 221 to and through coil 191 and from there through conductor 223 to conductor 225 and from there to the other supply circuit conductor 29. In case, therefore, that the temperature of the heat storage mass is still below a value of substantially 800° F. at the end of an off-peak period when contact arms 157, 155 and 153 are moved out of engagement with each other, the holding circuit being independent of the timer-controlled switch, and controlled particularly by the main thermal switch 63, the contactor 189 will be held in such position that energization of the heater 61 will be continued beyond the end of an off-peak period. This energization will continue until bimetal bar 65 moves out of engagement with contact 67 which, of course, will occur when the heat storage mass reaches a temperature of substantially 800° F., at which time coil 207 is deenergized and high-rate meter 205 is connected in circuit.

Let it now be assumed that because of some abnormal condition it is desired to effect energization of the heater 61 during the period extending from about 6 a. m. to 10 p. m. In this case all that is necessary for the operator or user to do is to press momentarily on the contact bridging member of push button switch 241 when an energizing circuit through coil 191 of contactor 189 will be established substantially as follows: From supply circuit conductor 27 through conductors 217 and 245, through the closed switch 241, through conductor 243 and coil 191 and from there through conductor 223 to conductor 225 and from there through the parts between the end of conductor 225 and supply circuit conductor 29. This momentary energization of coil 191 of electromagnetic switch 189 will cause movement of the main and the auxiliary contact bridging members of switch 189 into engagement with the fixed contact members whereby the hereinbefore described energizing circuit through heater 61 and the holding circuit through coil 191 will be effected whereby the user can generate heat and store it in the heat storage mass as might conceivably be necessary in case of a sudden great drop of temperature.

It is to be pointed out here further that the coil of solenoid 207 is effective to cause proper connection in circuit with the heater 61 of a low-rate meter or a high-rate meter, the control of the energization of solenoid 207 being by the timer-controlled switch including more particularly the contact arms 157 and 155. It is to be pointed out further that the end of conductor 225 connected to the pivotally supported switch arm 211 is always in electrical engagement with or electrically connected to the other supply circuit conductor 29 and where I have stated that energization of a given circuit was effected through conductor 223 or conductor 231, it is to be understood that the same statement applies as to being connected to the other supply circuit conductor 29.

The various modifications of systems embodying my invention and shown in the various figures of the drawings therefore provide relatively simple systems effective for the intended purpose, namely to cause energization of the electric heater and attendant storage of heat in a heat storage mass at the start of an off-peak period in case the temperature of the heat storage mass at the start of an off-peak period is less than a predetermined value or to start energization of the heater after a fixed delay time interval after the start of an off-peak period in case the temperature of the heat storage mass is above said predetermined value. Several forms of systems embodying my invention effect deenergization of the electric heater at the end of an off-peak period and no further heat can be stored in the heat storage mass until the start of the next off-peak period.

One of the systems embodying my invention, namely that shown in Fig. 4, is effective to prolong the energization of the electric heater beyond the termination of an off-peak period in case the temperature of the heat storage mass is still below the desired value and this system further permits of the user effecting energization of the system and generation of heat with attendant storage of such heat at any time during the rest of the day should this become necessary.

Reference may now be made to means for preventing flow of air through the heat storage mass 13 at those times when the fan 23 is not operating, shown in Fig. 1. This means includes a damper plate 251 pivotally supported in the conduit between the enclosure 11 and the room 19 and controlled by a solenoid 253 connected in series electric circuit with the fan motor 23 and its controlling room thermostat 25. A biasing spring 255 tends to hold the damper 251 closed as shown in Fig. 1, this being the position which the damper plate will take when the room is above a given temperature and the thermostat 25 is open. This will prevent the flow of undesired convection currents of air through the heat storage mass at those times when the mass is being heated and also during those periods of the day when the room is at the desired temperature, thereby conserving heat in the heat storage mass.

Various modifications may be made in my invention without departing from the spirit and scope thereof and all such obvious modifications clearly coming within the scope of the appended claims shall be considered to be covered thereby.

I claim as my invention:

1. An off-peak heat storage system for heating a heat storage mass comprising an electric heater for said mass, a continuously operative timer, switching means controlled jointly by said timer and by the temperature of said heat storage mass for selectively causing energization of said heater at the start of an off-peak period in case the temperature of the storage mass is below a set value and to delay the energization of said heater for a given time interval in case the temperature of the heat storage mass is above said set value.

2. An off-peak heat storage system for heating a heat storage mass comprising an electric heater for said mass, a continuously operative timer, time and temperature controlled switching means to selectively effect energization of said heater at substantially the start of an off-peak period in case the temperature of the heat storage mass is below a predetermined value and to delay the energization of said heater for a preset fixed length of time in case the temperature of the heat storage mass is above said predetermined value at the start of an off-peak period and remains above said predetermined value during said delay period.

3. An off-peak heat storage system for heating a heat storage mass comprising an electric heater for said mass, a continuously operative timer, time and temperature controlled switching means to selectively effect energization of said heater at substantially the start of an off-peak period in case the temperature of the heat storage mass is below a predetermined value, to prevent energization of the heater at the start of an off-peak period in case the temperature of the heat storage mass is above said predetermined value at the start of an off-peak period and to effect energization of said heater after a fixed time interval after the start of an off-peak period in case the temperature of the heat storage mass is below a second higher predetermined temperature.

4. An off-peak heat storage system for heating a heat storage mass comprising an electric heater for said mass, a continuously operative timer, switching means controlled jointly by said timer and by the temperature of said heat storage mass for selectively causing energization of said heater at the start of an off-peak period in case the temperature of the storage mass is below a set value and to delay the energization of said heater for a given time interval in case the temperature of the heat storage mass is above said set value and a thermally-actuable switch for causing deenergization of said heater when the temperature of said heat storage mass has been raised to a predetermined high value.

5. An off-peak heat storage system for heating a heat storage mass comprising an electric heater for said mass, a continuously operative timer, time and temperature controlled switching means to selectively effect energization of said heater at substantially the start of an off-peak period in case the temperature of the heat storage mass is below a predetermined value, to prevent energization of the heater at the start of an off-peak period in case the temperature of the heat storage mass is above said predetermined value at the start of an off-peak period and to effect energization of said heater after a fixed time interval after the start of an off-peak period in case the temperature of the heat storage mass is below a second higher predetermined temperature and a thermally-actuable switch for causing deenergization of said heater when the temperature of said heat storage mass has been raised to a predetermined high value.

6. An off-peak heat storage system for heating a heat storage mass, comprising an electric heater for said mass, an electromagnetic heater control switch, switches controlled respectively by time and by the temperature of the heat storage mass for controlling said electromagnetic switch to selectively cause energization of said heater at the start of an off-peak period in case the temperature of said heat storage mass is below a given value, to delay the energization of said heater after the start of an off-peak period in case the temperature of said heat storage mass is above said given value and to cause energization of said heater after a preset time interval after the start of an off-peak period in case the temperature of the heat storage mass is less than a second given value higher than said first given value.

7. An off-peak heat storage system for heating a heat storage mass, comprising an electric heater for said mass, an electromagnetic heater control switch, switches controlled respectively by time and by the temperature of the heat storage mass for controlling said electromagnetic switch to selectively cause energization of said heater to be delayed after the start of an off-peak period in case the temperature of said heat storage mass is above a predetermined value and to be effected as soon as withdrawal of heat from said heat storage mass causes its temperature to drop below said predetermined value, a thermal switch responsive to the temperature of said heat storage mass for causing deenergization of said heater when the temperature of said heat storage reaches a second predetermined value higher than said first predetermined value, and a normally open switch adapted to be momentarily closed to cause the electromagnetic switch to energize said heater during the on-peak period.

8. An off-peak heat storage system for heating a heat storage mass comprising an electric heater for said mass, a continuously operative timer, time and temperature controlled switching means to selectively effect energization of said heater at substantially the start of an off-peak period in case the temperature of the heat storage mass is below a predetermined value, to prevent energization of the heater at the start of an off-peak period in case the temperature of the heat storage mass is above said predetermined value at the start of an off-peak period and to effect energization of said heater as soon as withdrawal of heat from said heat storage mass causes a reduction of the temperature of said heat storage mass to below said predetermined value, and a normally open switch adapted to be momentarily closed to cause said switching means to energize said heater during the on-peak period.

CLARK M. OSTERHELD.